United States Patent
Daandels et al.

(10) Patent No.: US 11,492,097 B2
(45) Date of Patent: Nov. 8, 2022

(54) WING AND AIRCRAFT

(71) Applicant: Airbus Operations GmbH, Hamburg (DE)

(72) Inventors: Dort Daandels, Hamburg (DE); Bernhard Schlipf, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 163 days.

(21) Appl. No.: 17/004,888

(22) Filed: Aug. 27, 2020

(65) Prior Publication Data
US 2021/0061437 A1  Mar. 4, 2021

(30) Foreign Application Priority Data

Aug. 30, 2019 (DE) .......................... 102019123371.2

(51) Int. Cl.
| | | |
|---|---|---|
| *B64C 3/50* | (2006.01) | |
| *B64C 9/02* | (2006.01) | |
| *B64C 9/24* | (2006.01) | |
| *B64C 13/28* | (2006.01) | |
| *B64C 7/00* | (2006.01) | |
| *B64C 9/18* | (2006.01) | |

(Continued)

(52) U.S. Cl.
CPC ................. *B64C 3/50* (2013.01); *B64C 5/06* (2013.01); *B64C 7/00* (2013.01); *B64C 9/02* (2013.01); *B64C 9/18* (2013.01); *B64C 9/24* (2013.01); *B64C 13/28* (2013.01); *B64C 13/38* (2013.01); *B64C 2009/005* (2013.01)

(58) Field of Classification Search
CPC .... B64C 3/50; B64C 5/06; B64C 7/00; B64C 9/02; B64C 9/18; B64C 9/24; B64C 13/28; B64C 13/38; B64C 2009/005; B64C 9/04
See application file for complete search history.

(56) References Cited

U.S. PATENT DOCUMENTS

| | | |
|---|---|---|
| 2,575,534 A | 11/1951 | Stoughton |
| 3,149,800 A | 9/1964 | Sintes et al. |

(Continued)

FOREIGN PATENT DOCUMENTS

| | | | | |
|---|---|---|---|---|
| CA | 2824108 A1 | * | 4/2014 | ........... B64C 23/072 |
| EP | 0411680 A1 | * | 2/1991 | ............... B64C 9/18 |

OTHER PUBLICATIONS

German Search Report; priority document, Pub Date Apr. 29, 2020.

*Primary Examiner* — Rodney A Bonnette
(74) *Attorney, Agent, or Firm* — Greer, Burns & Crain, Ltd.

(57) ABSTRACT

A wing for an aircraft including a wing tip section with an inboard section, a fairing in which an opening connecting an exterior of the fairing and an interior of the fairing is formed and which is mounted to the inboard section of the wing tip section, a movable device arranged in the exterior of the fairing, a connecting assembly movably connecting the movable device to the wing tip section such that the movable device is movable between a retracted position and at least one extended position, and a drive mechanism. The connecting assembly includes an actuating element, which extends through the opening and includes a first section, which is arranged in the interior of the fairing and is drivingly coupled to the drive mechanism, and a second section, which is arranged in the exterior of the fairing and coupled to the movable device.

18 Claims, 11 Drawing Sheets

(51) Int. Cl.
*B64C 5/06* (2006.01)
*B64C 13/38* (2006.01)
*B64C 9/00* (2006.01)

(56) References Cited

U.S. PATENT DOCUMENTS

| | | |
|---|---|---|
| 3,218,005 A | 11/1965 | Calderon |
| 3,744,745 A * | 7/1973 | Kerker ................. B64C 23/06 244/199.1 |
| 6,126,118 A * | 10/2000 | Fujino ................. B64D 29/02 244/54 |
| 9,963,220 B2 * | 5/2018 | Ishihara ................. B64C 13/30 |
| 2013/0087662 A1 * | 4/2013 | Soenarjo ................. B64C 9/18 244/215 |
| 2016/0130012 A1 | 5/2016 | Laguia-Barnola et al. |
| 2018/0141636 A1 * | 5/2018 | Currie ................. B64C 9/02 |
| 2020/0094947 A1 * | 3/2020 | Commis ............... B64C 23/069 |

* cited by examiner

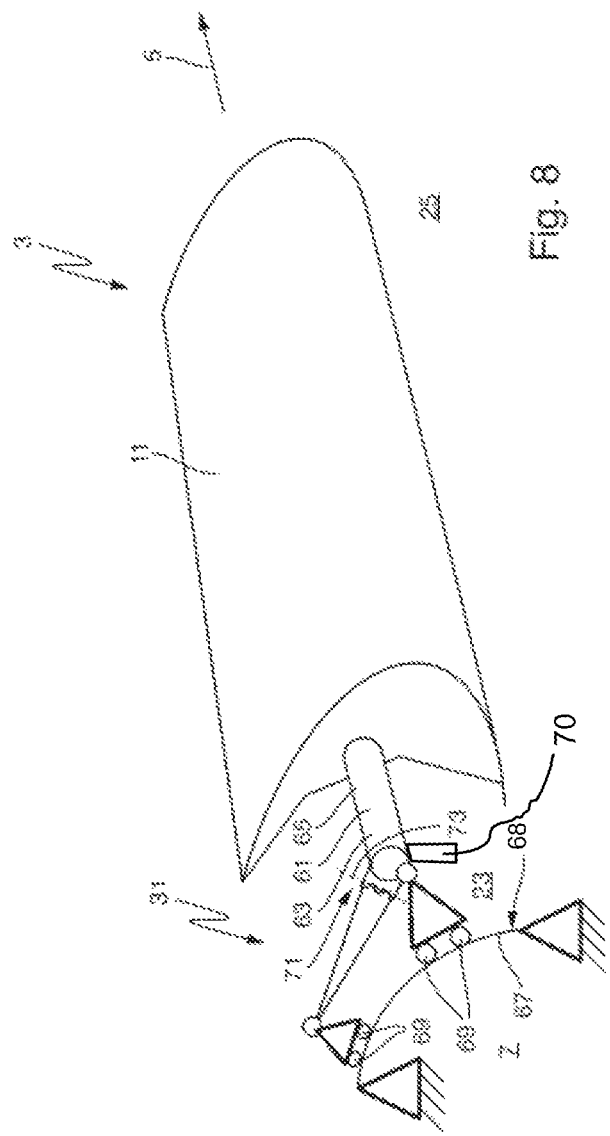

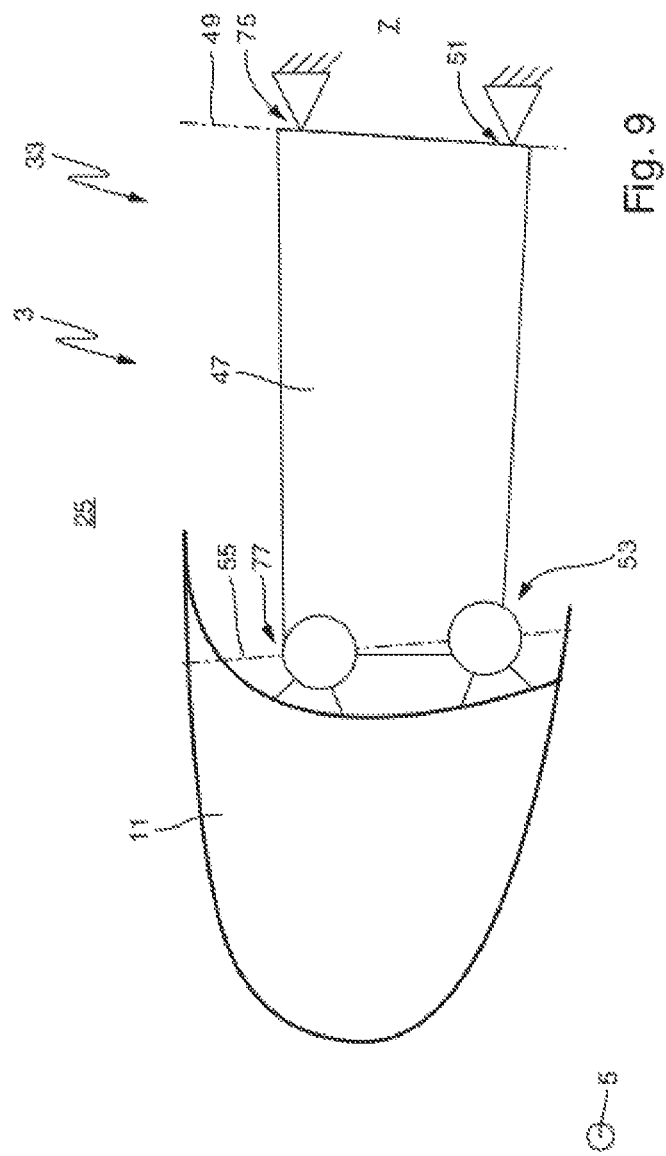

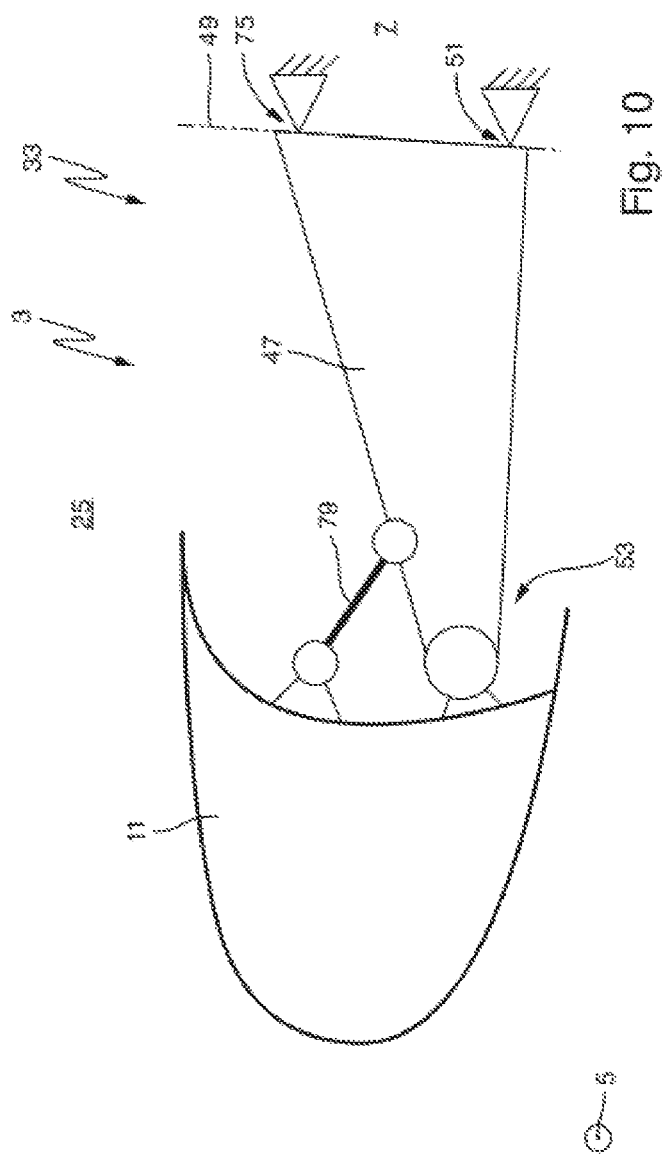

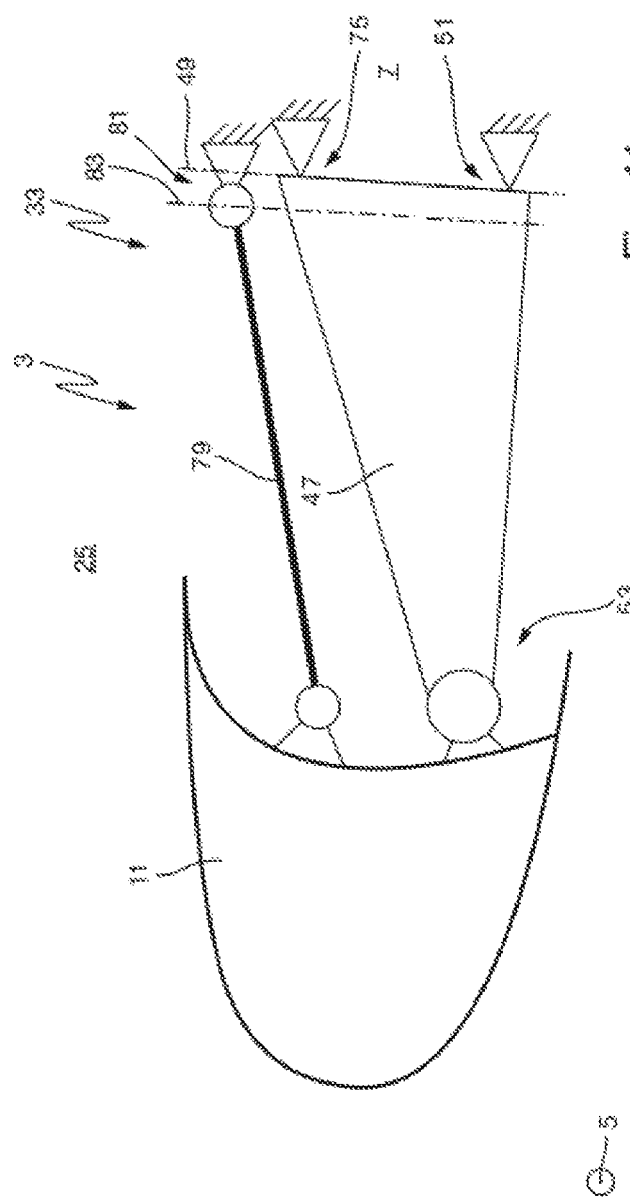

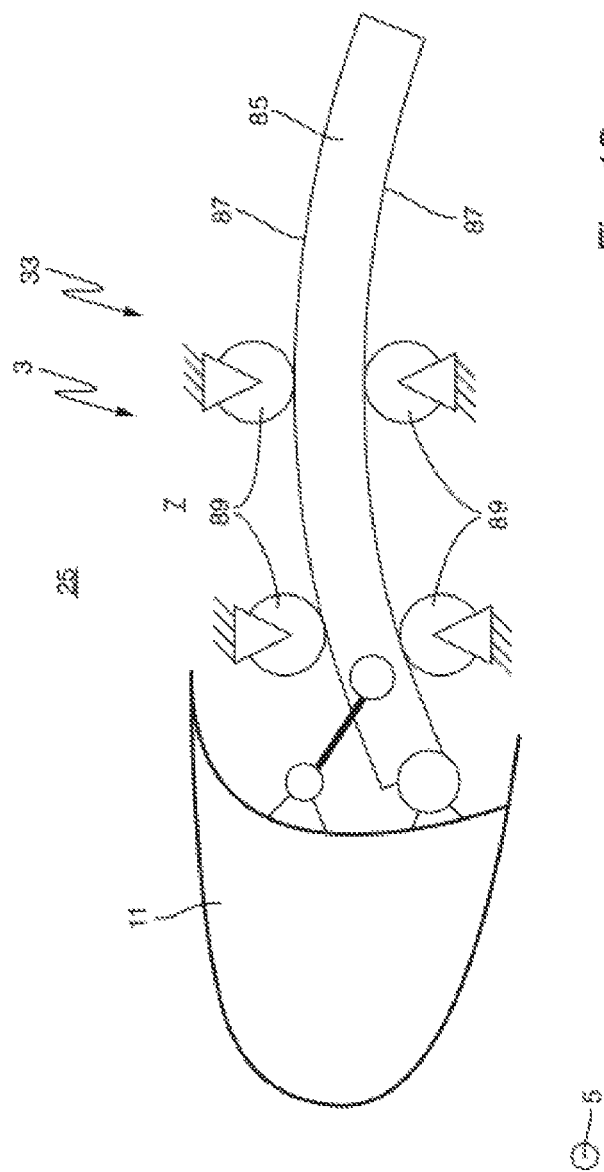

WING AND AIRCRAFT

CROSS-REFERENCES TO RELATED APPLICATIONS

This application claims the benefit of the German patent application No. 102019123371.2 filed on Aug. 30, 2019, the entire disclosures of which are incorporated herein by way of reference.

FIELD OF THE INVENTION

The invention relates to a wing for an aircraft and an aircraft.

BACKGROUND OF THE INVENTION

Wings comprising movable devices, such as high lift devices to increase the amount of lift the wing can provide during flight of an aircraft, are known. To provide a desirable amount of lift or to provide a sufficient flight control, it is beneficial to arrange movable devices along the entire wing from a section of the wing which is mountable to a fuselage of the aircraft up to a section of the wing which is arranged furthest away from the fuselage in a wingspan direction of the wing when the wing is mounted to the fuselage.

Particularly, in the case of high aspect ratio wings and in the area of a wing tip section of the wing it is difficult to allocate enough space for a connecting assembly, which is necessary for movably connecting the movable device to the wing, and at the same time to meet the aerodynamic requirements for the wing to achieve a resource efficient operation of the aircraft. This is especially the case when the wing comprises a foldable wing tip section, which is movable with respect to a fixed wing section of the wing.

Therefore, it is desirable to provide a wing for an aircraft and an aircraft with which it is possible to arrange movable devices along the entire wing and at the same time allow a resource efficient operation of the aircraft.

SUMMARY OF THE INVENTION

An object of the invention is to provide a wing for an aircraft and an aircraft with which it is possible to arrange movable devices along the entire wing and at the same time allow a resource efficient operation of the aircraft.

According to a first aspect of the invention, the object is solved by a wing configured for an aircraft. The wing comprises a wing tip section with an inboard section. The wing comprises a fairing in which an opening connecting an exterior of the fairing and an interior of the fairing is formed. The fairing is mounted to the inboard section of the wing tip section. The wing comprises a movable device arranged in the exterior of the fairing. The wing comprises a connecting assembly movably connecting the movable device to the wing tip section such that the movable device is movable between a retracted position and at least one extended position. The wing comprises a drive mechanism. The connecting assembly comprises an actuating element, which extends through the opening. The actuating element comprises a first section. The first section is arranged in the interior of the fairing. The first section is drivingly coupled to the drive mechanism. The actuating element comprises a second section. The second section is arranged in the exterior of the fairing. The second section is coupled to the movable device.

The wing is configured for the aircraft such that the wing is mountable to a remaining section of the aircraft to form the aircraft. The wing comprises the wing tip section with the inboard section. The inboard section of the wing tip section may be configured to be mountable to a fixed wing section of the wing. The fixed wing section may be configured to be mountable to a fuselage of the aircraft. The wing tip section may extend in a wingspan direction of the wing. In case the wing is mounted to a remaining section of the aircraft to form the aircraft, the wingspan direction of the wing points away from the fuselage of the aircraft. Preferably, the wingspan direction of the wing is oriented in parallel to a wing surface of the wing and/or transversely to a flight direction of the aircraft in case the wing is mounted to a remaining section of the aircraft to form the aircraft.

The wing comprises the fairing. It is preferred that the fairing comprises a continuous total outer surface to provide an advantageous aerodynamic shape. It is particularly preferred that the shape of the outer surface of the fairing is similar to the shape of the outer surface of a tip tank. The fairing may be elongate such that a longitudinal extension of the fairing is larger than a transverse extension of the fairing. It is particularly preferred that the fairing extends, preferably along its longitudinal extension, transversely to the wingspan direction of the wing.

The opening connecting the exterior of the fairing and the interior of the fairing is formed in the fairing. Since the opening connects the exterior of the fairing and the interior of the fairing, the opening allows to arrange an element, for example the actuating element, such that the element extends through the opening and thereby connecting an element arranged in the interior of the fairing, such as the drive mechanism, and an element arranged in the exterior of the fairing, such as the movable device. At the same time, elements can be arranged in the interior of the fairing and are shielded from the air flowing along the wing by the fairing during flight. Therefore, elements can be arranged in the area of the wing tip section of the wing and due to the advantageous aerodynamic shape of the fairing, the shape of the wing is such that a resource efficient operation of the aircraft is possible. Preferably, the opening is formed in the fairing on a side of the fairing facing away from the fuselage of the aircraft when the wing is mounted to a remaining section of the aircraft to form the aircraft. When the opening is formed in the fairing on a side of the fairing facing away from the fuselage of the aircraft, the opening provides a passage for arranging an element that can connect an element in the interior of the fairing, such as the drive mechanism, with an element in the exterior of the fairing arranged on the side of the fairing facing away from the fuselage of the aircraft, such as the movable device. Further, it is preferred that the opening is arranged transversely to the flight direction when the wing is mounted to a remaining section of the aircraft to form the aircraft. When the opening is arranged transversely to the flight direction, air flowing along the wing during flight does not flow frontally towards the opening, which reduces the air drag of the aircraft.

The interior of the fairing can be regarded as the space which is surrounded by the fairing and in which elements can be arranged such as the drive mechanism and the first section of the actuating element. The interior of the fairing may be thought of as the space which is enclosed by the fairing. The interior of the fairing can be regarded as being defined by the fairing. If an element is arranged in the interior of the fairing, the element may be regarded as being enclosed by the fairing. Further, the exterior of the fairing can be regarded as the space which is not surrounded by the fairing and in which elements can be arranged such as the movable device and the second section of the actuating element. The exterior of the fairing may be thought of as the space which is not enclosed by the fairing. For example, the fuselage of the aircraft is arranged in the exterior of the fairing. If an element is arranged in the exterior of the fairing, the element may be regarded as being not enclosed by the fairing or as being arranged outside of the fairing.

The fairing is mounted to the inboard section of the wing tip section. Due to the mounting of the fairing to the inboard section of the wing tip section, at least a section of the faring is stationary with respect to the wing tip section, especially when the movable device is moved between the retracted position and the at least one extended position.

The wing comprises the movable device arranged in the exterior of the fairing. The movable device may provide a section of the aerodynamic surface of the wing. Since the movable device is arranged in the exterior of the fairing, air flowing along the wing during flight also flows along the surface of the movable device such that the movable device contributes to the lift the wing provides and/or to desirable flight control during flight of the aircraft.

The wing comprises the connecting assembly movably connecting the movable device to the wing tip section such that the movable device is movable between the retracted position and the at least one extended position. The retracted position of the movable device may correspond to a configuration of the wing when the aircraft is on ground or in normal flight. Preferably, the retracted position of the movable device is the position of the movable device in which the movable device is arranged closest to the wing tip section. Further, a first extended position of the at least one extended position of the movable device may correspond to a take-off configuration of the wing. In addition, a second extended position of the at least one extended position of the movable device may correspond to a landing configuration of the wing. Preferably, the second extended position of the movable device is the position of the movable device in which the movable device is arranged furthest away from the wing tip section. It is further preferred that in the first extended position of the movable device the movable device is arranged between the retracted position and the second extended position of the movable device. Preferably, the movable device is movable from the retracted position to the first extended position and from the first extended position to the retracted position. Further, the movable device is preferably movable from the retracted position to the second extended position and from the second extended position to the retracted position.

The wing comprises the drive mechanism. Preferably, the drive mechanism is configured to drive movement of the actuating element which in turn drives movement of the movable device. Especially, the drive mechanism is configured to drive movement of the movable device between the retracted position and the at least one extended position, i.e., from the retracted position to the at least one extended position and from the at least one extended position to the retracted position via the actuating element. Preferably, the actuating element is movable between a first position and at least one second position such that the actuating element is in the first position when the movable device is in the retracted position and the actuating element is in the at least one second position when the movable device is in the at least one extended position. It is preferred that the first section of the actuating element moves in the interior of the fairing when the movable device moves between the retracted position and the at least one extended position.

Preferably, during movement of the actuating element, the first section of the actuating element is at each point in time arranged in the interior of the fairing. The drive mechanism may be powered electrically and/or hydraulically and/or pneumatically. The drive mechanism may comprise an actuator, which may be a rotary actuator or a linear actuator, or a pinion drive.

The connecting assembly comprises the actuating element, which extends through the opening. The actuating element extends through the opening, which allows the actuating element to connect an element arranged in the interior of the fairing, such as the drive mechanism, and an element arranged in the exterior of the fairing, such as the movable device. The actuating element is movable between the first position and the at least one second position. The opening is formed such that the actuating element can extend through the opening in the first position, in the at least one second position, and when the actuating element is moved between the first position and the at least one second position. The actuating element may comprise a trunnion or may be formed as a trunnion. The actuating element can also be regarded as a connecting element, which may be configured to connect the drive mechanism and the movable device. Preferably, the actuating element is not a section of the drive mechanism. Particularly, the actuating element is not a section of the actuator of the drive mechanism. However, the drive loads to drive movement of the movable device between the retracted position and the at least one extended position may be transferred from the drive mechanism via the actuating element to the movable device. It is particularly preferred that all drive loads to drive movement of the movable device between the retracted position and the at least one extended position are transferred from the drive mechanism via the actuating element to the movable device.

The first section of the actuating element is arranged in the interior of the fairing such that the first section of the actuating element may be mounted to an element arranged in the interior of the fairing. The first section of the actuating element is drivingly coupled to the drive mechanism such that the drive mechanism can drive movement of the actuating element. The first section of the actuating element may be mounted directly to the drive mechanism. Alternatively, the first section of the actuating element may be coupled via an element, such as a lever and/or a strut, to the drive mechanism. The lever and/or the strut is/are preferably arranged in the interior of the fairing. It is preferred in the context of the present invention that a lever can transmit forces and moments and that a strut can transmit tensile and compressive forces.

The second section of the actuating element is arranged in the exterior of the fairing such that the second section of the actuating element may be mounted to an element arranged in the exterior of the fairing. The second section of the actuating element is coupled to the movable device such that the actuating element can drive movement of the movable device. The second section of the actuating element may be mounted directly to the movable device. Alternatively, the second section of the actuating element may be coupled via an element, such as a lever and/or a strut, to the movable device. The lever and/or the strut is/are preferably arranged in the exterior of the fairing.

In summary, a wing for an aircraft is provided with which it is possible to arrange movable devices along the entire wing and at the same time allow a resource efficient operation of the aircraft.

According to a preferred embodiment of the wing, a first fairing section of the fairing is fluid-tight and arranged such that a first cavity is formed in the interior of the fairing. The first cavity may be separated from the remaining interior of the fairing by the first fairing section. The first cavity can be regarded as being defined by the first fairing section, which completely encloses the first cavity such that fluid in the first cavity is maintained inside the first cavity. The first fairing section may form a first inner surface, which faces the first cavity. Preferably, the first fairing section comprises a skin, which forms a first outer surface. Further, it is preferred that the first fairing section comprises a first inner layer, which forms the first inner surface. The first inner surface may be mounted to the skin of the first fairing section. Alternatively, the first inner layer may be mounted to the skin of the first fairing section via a mechanical support of the first fairing section. Preferably, the first inner layer is fluid-tight. The first cavity can be filled with a fluid, such as fuel. Alternatively, luggage can be arranged inside the first cavity.

According to a preferred embodiment of the wing, a second fairing section of the fairing is fluid-tight and arranged such that a second cavity is formed in the interior of the fairing. The second cavity may be separated from the remaining interior of the fairing by the second fairing section. The second cavity can be regarded as being defined by the second fairing section, which completely encloses the second cavity such that fluid in the second cavity is maintained inside the second cavity. The second fairing section may form a second inner surface, which faces the second cavity. Preferably, the second fairing section comprises a skin, which forms a second outer surface. Further, it is preferred that the second fairing section comprises a second inner layer, which forms the second inner surface. The second inner surface may be mounted to the skin of the second fairing section. Alternatively, the second inner layer may be mounted to the skin of the second fairing section via a mechanical support of the second fairing section. Preferably, the second inner layer is fluid-tight. The second cavity can be filled with a fluid, such as fuel. Alternatively, luggage can be arranged inside the second cavity.

According to a preferred embodiment of the wing, the wing comprises a seal with a first section connected to the fairing and a second section abutting the actuating element when the movable device is moved between the retracted position and the at least one extended position such that the interior of the fairing and the exterior of the fairing are separated from each other by the seal. Since the seal separates the interior of the fairing and the exterior of the fairing, the seal prevents contamination of the interior of the fairing. Further, since the second section of the seal abuts the actuating element when the movable device is moved between the retracted position and the at least one extended position, the seal can separate the interior of the fairing and the exterior of the fairing during movement of the actuating element between the first position and the at least one second position. The seal separates the interior of the fairing and the exterior of the fairing, which does particularly not exclude that the interior of the fairing and the exterior of the fairing are also separated at least by the fairing and the actuating element. The seal may comprise an outer surface which provides together with the outer surface of the fairing a section of a total outer surface of the wing with an advantageous aerodynamic shape.

According to a preferred embodiment of the wing, the movable device is a leading edge movable device. In case the movable device is a leading edge movable device, a particularly preferred embodiment is provided.

According to a preferred embodiment of the wing, the leading edge movable device is a slat. In case the leading edge movable device is a slat, a particularly preferred embodiment is provided.

According to a preferred embodiment of the wing, the leading edge movable device is a droop nose. In case the leading edge movable device is a droop nose, a particularly preferred embodiment is provided.

According to a preferred embodiment of the wing, the leading edge movable device is a Krueger flap. In case the leading edge movable device is a Krueger flap, a particularly preferred embodiment is provided.

According to a preferred embodiment of the wing, the movable device is a trailing edge movable device. In case the movable device is a trailing edge movable device, a particularly preferred embodiment is provided.

According to a preferred embodiment of the wing, the trailing edge movable device is an aileron. In case the trailing edge movable device is an aileron, a particularly preferred embodiment is provided.

According to a preferred embodiment of the wing, the trailing edge movable device is a flap. In case the trailing edge movable device is a flap, a particularly preferred embodiment is provided.

According to a preferred embodiment of the wing, the trailing edge movable device is a flaperon. In case, the trailing edge movable device is a flaperon, a particularly preferred embodiment is provided.

According to a preferred embodiment of the wing, the connecting assembly comprises an inboard mechanism comprising the actuating element and an outboard mechanism, which is arranged spaced apart in a wingspan direction of the wing from the inboard mechanism. Since the inboard mechanism and the outboard mechanism are spaced apart in the wingspan direction of the wing, the movable device can be movably connected to the wing tip section in two areas spaced apart from each other, such that a mechanically robust movable connection of the movable device to the wing tip section can be provided. Preferably, the inboard mechanism comprises the actuating element and movement of the actuating element is driven by the drive mechanism such that movement of the movable device between the retracted position and the at least one extended position is driven by the actuating element. Since the inboard mechanism comprises the actuating element, movement of the movable device is driven by the inboard mechanism. Preferably, the outboard mechanism does not drive movement of the movable device. Further it is preferred that movement of at least a section of the outboard mechanism is indirectly driven by the drive mechanism via the actuating element and the movable device. Therefore, no drive mechanism needs to be provided in the area of the outboard mechanism. This is particularly advantageous, since it may be difficult to allocate enough space for a drive mechanism in an outboard section of the wing tip section. Preferably, the outboard mechanism is entirely arranged in the exterior of the fairing. Further, it is preferred that the wing comprises several outboard mechanisms, which are arranged spaced apart in a wingspan direction of the wing from each other and from the inboard mechanism. It is preferred that the distances between neighboring outboard mechanisms are the same in the wingspan direction. In case the wing comprises several outboard mechanisms, it is preferred that each of the outboard mechanisms does not drive movement of the movable device. Further it is preferred that movement of at least a section of each outboard mechanism is indirectly driven by the drive mechanism via the actuating element and the movable device.

According to a preferred embodiment of the wing, the inboard mechanism comprises a first hinge coupled to the actuating element and coupled to the wing tip section such that the actuating element is pivotable about a first hinge axis. In case the inboard mechanism comprises a first hinge coupled to the actuating element and coupled to the wing tip section such that the actuating element is pivotable about a first hinge axis, a simple and lightweight connecting assembly is provided. Preferably, the actuating element can move between the first position and the at least one second position by pivoting about the first hinge axis. The actuating element, particularly the first section of the actuating element, may be mounted to the first hinge. Alternatively, the actuating element, particularly the first section of the actuating element, may be mounted to a further element, which is mounted to the first hinge. Further, the first hinge may be mounted to the wing tip section. Alternatively, the first hinge may be mounted to a further element, which is mounted to the wing tip section. Preferably, the first hinge is arranged in the interior of the fairing.

According to a preferred embodiment of the wing, the inboard mechanism comprises a first lever coupled to the actuating element and coupled to the first hinge such that the first lever is pivotable about the first hinge axis. Movement of the first lever about the first hinge axis can be driven by the drive mechanism such that the first lever drives movement of the actuating element which in turn drives movement of the movable device. When the first lever pivots about the first hinge axis, the first lever can provide a tensile force acting on the actuating element against the wingspan direction of the wing such that the movable device can drive movement of a section of the outboard mechanism when the movable device moves from the retracted position to the at least one extended position. Thereby, an outboard mechanism can be provided without the need of an additional drive mechanism in the area of the outboard section of the wing tip section. Preferably, the first lever is arranged in the interior of the fairing.

According to a preferred embodiment of the wing, the inboard mechanism comprises a first strut coupled to the actuating element and a second hinge coupled to the first strut and to the wing tip section such that the first strut is pivotable about a second hinge axis. The first strut can provide a mechanical reinforcement of the inboard mechanism against loads acting on the inboard mechanism in the wingspan direction. Preferably, the first strut is arranged in the interior of the fairing. Further, it is preferred that the second hinge is arranged in the interior of the fairing.

According to a preferred embodiment of the wing, the first hinge axis and the second hinge axis extend along the same line. When the first hinge axis and the second hinge axis extend along the same line, the first lever and the first strut can pivot about the same axis such that the inboard mechanism is mechanically robust against loads acting on the inboard mechanism when the movable device is moved between the retracted position and the at least one extended position.

According to a preferred embodiment of the wing, the inboard mechanism comprises a first track with a first track surface and a first roller which rolls along the first track surface when the movable device moves between the retracted position and the at least one extended position. When the inboard mechanism comprises the first track with the first track surface and the first roller which rolls along the first track surface when the movable device moves between the retracted position and the at least one extended position, a space saving and mechanically robust inboard mechanism can be provided. Preferably, the first track is arranged in the interior of the fairing. Further, it is preferred that the first roller is arranged in the interior of the fairing. Preferably, the inboard mechanism comprises a first roller or several first rollers, which roll along the first track surface when the movable device moves between the retracted position and the at least one extended position.

According to a preferred embodiment of the wing, the outboard mechanism comprises a second lever, a third hinge coupled to the second lever and to the wing tip section, and a fourth hinge coupled to the second lever and to the movable device such that the second lever is pivotable about a third hinge axis and about a fourth hinge axis. Movement of the second lever about the third hinge axis and about the fourth hinge axis can be driven by the movement of the movable device. When the second lever pivots about the third hinge axis and about the fourth hinge axis, an outboard section of the movable device can be moved away from the wing tip section such that the movable device is moved from the retracted position to the at least one extended position. Thereby, an outboard mechanism is provided without the need of an additional drive mechanism in the area of the outboard section of the wing tip section. The outboard mechanism can comprise one third hinge or multiple third hinges, which are each coupled to the second lever and to the wing tip section. Further, the outboard mechanism can comprise one or multiple fourth hinges, which are coupled to the second lever and to the movable device. In case the outboard mechanism comprises multiple third hinges and/or multiple fourth hinges a particularly mechanically robust outboard mechanism is provided.

According to a preferred embodiment of the wing, the outboard mechanism comprises a second strut coupled to the wing tip section and to the movable device. In case the outboard mechanism comprises a second strut coupled to the wing tip section and to the movable device, further elements connecting the movable device and the wing tip section can be designed in a more light weight fashion, since some of the loads which need to be transferred between the movable device and the wing tip section by the outboard mechanism can be transferred by the second strut. Further, the second strut can be used to set the angle between the movable device and the wing tip section. Generally, the mechanical coupling between the wing tip section and the movable device can be improved with the second strut.

According to a preferred embodiment of the wing, the outboard mechanism comprises a fifth hinge coupled to the wing tip section and coupled to the second strut such that the second strut is pivotable about a fifth hinge axis. It is preferred that the third hinge axis and the fifth hinge axis extend along the same line. When the third hinge axis and the fifth hinge axis extend along the same line, the second lever and the second strut can pivot about the same axis such that the outboard mechanism is mechanically robust against loads acting on the outboard mechanism when the movable device is moved between the retracted position and the at least one extended position. Alternatively, it is preferred that the third hinge axis and the fifth hinge axis do not extend along the same line. When the third hinge axis and the fifth hinge axis do not extend along the same line, the second lever and the second strut can pivot about different axes such that the angle between the movable device, especially the outboard section of the movable device, and the wing tip section may change when the movable device is moved between the retracted position and the at least one extended position. It is particularly preferred that the third hinge axis and the fifth hinge axis extend parallel to each other. Preferably, the third hinge axis and a line oriented perpendicular to an upper surface of the wing tip section form an angle greater than zero, such that an outboard section of the movable device can move such that at least a part of the movement is a pivoting around a movement axis oriented in parallel to a leading edge of the wing tip section. It is particularly preferred that the movable device rotates around the movement axis and simultaneously translates along it when the movable device moves between the retracted position and the at least one extended position. It is further preferred that the movement axis extends transversely to the first hinge axis.

According to a preferred embodiment of the wing, the outboard mechanism comprises a second track with a second track surface and a second roller which rolls along the second track surface when the movable device moves between the retracted position and the at least one extended position. When the outboard mechanism comprises the second track with the second track surface and the second roller which rolls along the second track surface when the movable device moves between the retracted position and the at least one extended position, a space saving and mechanically robust outboard mechanism can be provided. Preferably, the outboard mechanism comprises a second roller or several second rollers, which roll along the second track surface when the movable device moves between the retracted position and the at least one extended position.

According to a preferred embodiment of the wing, the drive mechanism is arranged in the interior of the fairing. In case the drive mechanism is arranged in the interior of the fairing, the drive mechanism is shielded from the air flowing along the wing by the fairing during flight, which allows to provide the drive mechanism in the area of the wing tip section and at the same time to at the same time a section of the outer surface of the wing is provided by the outer surface of the fairing to provide an advantageous aerodynamic shape of the wing. Alternatively, the drive mechanism may be arranged in the exterior of the fairing. Preferably, the drive mechanism is arranged on a side of the fairing facing away from the wing tip section. It is particularly preferred that the drive mechanism is arranged in an interior defined by the fixed wing section or in an interior defined by the fuselage of the aircraft when the wing is mounted to the aircraft. In case the drive mechanism is arranged in the exterior of the fairing, the drive mechanism is drivingly coupled to the first section of the actuating element via a further element or via further elements, such as a shaft or multiple shafts and/or a pinion or multiple pinions.

According to a preferred embodiment of the wing, the wing comprises a fixed wing section mounted to the wing tip section via a sixth hinge arranged in the interior of the fairing such that the wing tip section is pivotable about a sixth hinge axis between an extended position and a folded position. Since the wing comprises a fixed wing section mounted to the wing tip section via a sixth hinge such that the wing tip section is pivotable about a sixth hinge axis between an extended position and a folded position, the space requirements of the aircraft can be reduced during maneuver and parking on ground. As soon as the aircraft has landed the wing tip section can be folded upwards or rearwards with respect to the fixed wing section, thereby reducing the overall span of the aircraft. Since the sixth hinge is arranged in the interior of the fairing, the sixth hinge is shielded from the air flowing along the wing by the fairing during flight. Therefore, due to the advantageous aerodynamic shape of the fairing, the shape of the wing is such that a resource efficient operation of the aircraft is possible. The wing may comprise a further drive mechanism which is configured to drive movement of the wing tip section about the sixth hinge axis. Preferably, the fairing comprises a third fairing section which is mounted to the fixed wing section and a fourth fairing section which is mounted to the wing tip section. Particularly, when the wing tip section is in the extended position, the third fairing section and the fourth fairing section define the interior of the fairing.

According to a preferred embodiment of the wing, the wing comprises a fin arranged on an outer surface of the fairing and extending into the exterior of the fairing. The fin may provide an improved stall behavior. For example, the critical angle of attack may be increased in case the wing comprises the fin arranged on the outer surface of the fairing.

In the context of the present invention, the term "element" can refer to any part of the wing and/or aircraft, such as the wing tip section, the fairing, the movable device, the connecting assembly, the drive mechanism, the first fairing section, the second fairing section, the seal, the inboard mechanism, the outboard mechanism, each of the hinges, each of the rollers, etc.

According to a second aspect of the present invention, the object is also solved by an aircraft comprising the features of claim 0. The aircraft comprises a wing according to an embodiment of the first aspect of the present invention. The features, technical effects and/or advantages described in connection with the first aspect of the present invention also apply to the second aspect of the present invention at least in an analogous manner, so that no corresponding repetition is made here.

Further features, advantages and application possibilities of the present invention may be derived from the following description of exemplary embodiments and/or the figures. Thereby, all described and/or visually depicted features for themselves and/or in any combination may form an advantageous subject matter and/or features of the present invention independent of their combination in the individual claims or their dependencies. Furthermore, in the figures, same reference signs may indicate same or similar objects.

BRIEF DESCRIPTION OF THE DRAWINGS

FIG. 8 schematically illustrates a second embodiment of the inboard mechanism of the wing shown in FIG. 4.

FIG. 9 schematically illustrates a first embodiment of an outboard mechanism of the wing shown in FIG. 4.

FIG. 10 schematically illustrates a second embodiment of the outboard mechanism of the wing shown in FIG. 4.

FIG. 11 schematically illustrates a third embodiment of the outboard mechanism of the wing shown in FIG. 4.

FIG. 12 schematically illustrates a fourth embodiment of the outboard mechanism of the wing shown in FIG. 4.

DETAILED DESCRIPTION OF THE PREFERRED EMBODIMENTS

Figure 1:
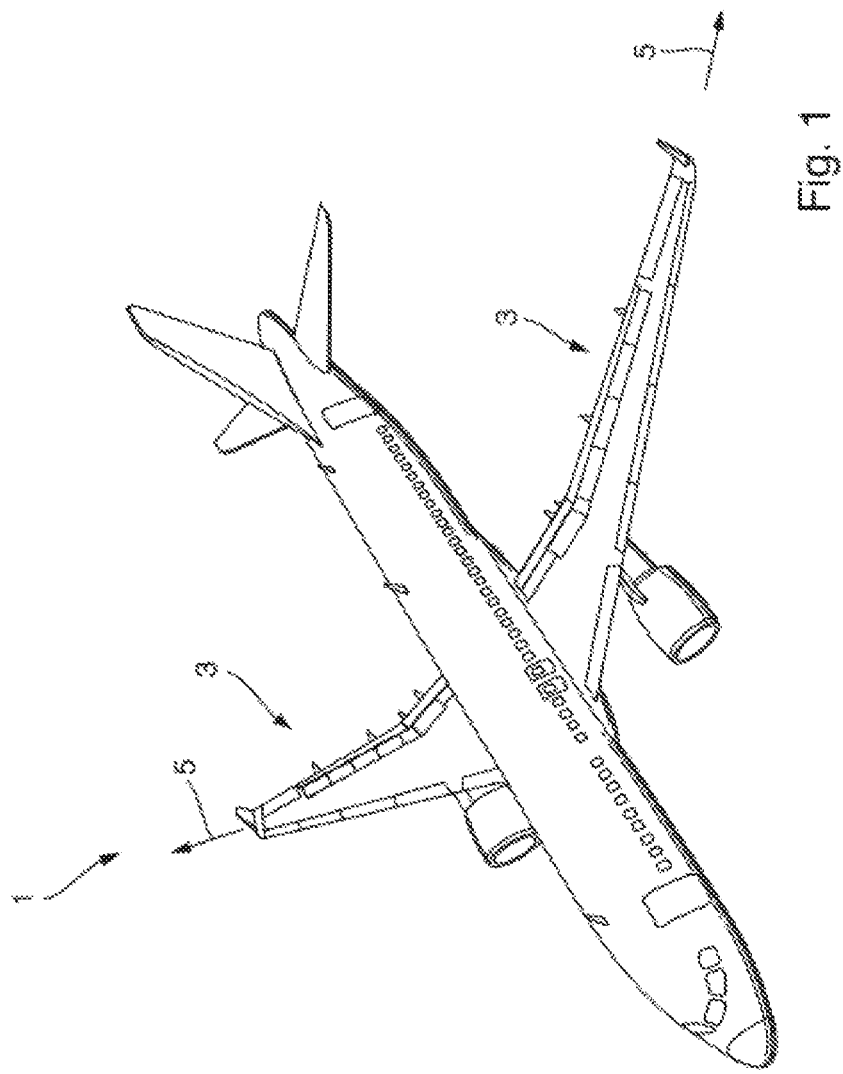
FIG. 1 schematically illustrates in a perspective view an embodiment of an aircraft comprising a wing.

FIG. 1 schematically illustrates in a perspective view an embodiment of an aircraft 1 comprising two wings 3, each extending in a respective wingspan direction 5. One wing 3 of the two wings 3 can be regarded as a left wing 3 of the aircraft 1 and the other wing 3 of the two wings 3 can be regarded as a right wing 3 of the aircraft 1. The features, technical effects and/or advantages described in connection with the left wing 3 apply to the right wing 3, and vice versa, at least in an analogous manner, so that no corresponding repetition is made here.

Figure 2:
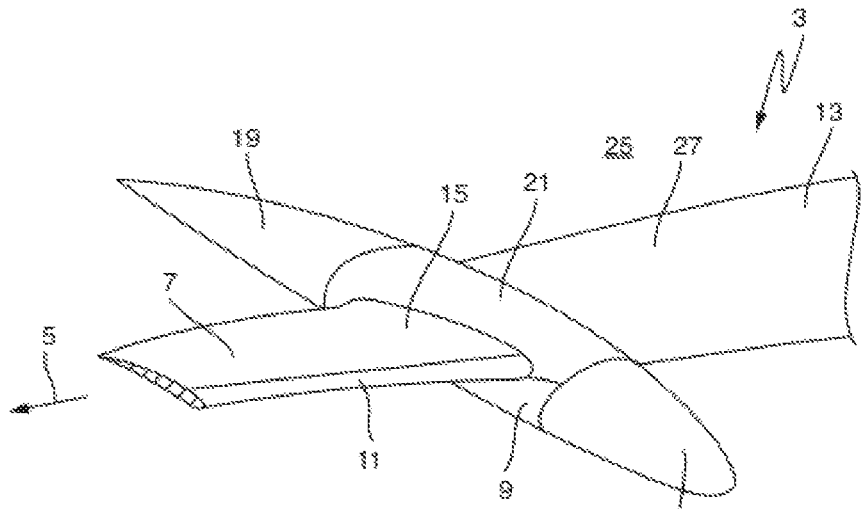
FIG. 2 schematically illustrates in a perspective view a section of a first embodiment of the wing shown in FIG. 1.

FIG. 2 schematically illustrates in a perspective view a section of a first embodiment of the right wing 3 shown in FIG. 1. The wing 3 comprises a wing tip section 7, a fairing 9, a movable device 11, and a fixed wing section 13.

Figure 4:
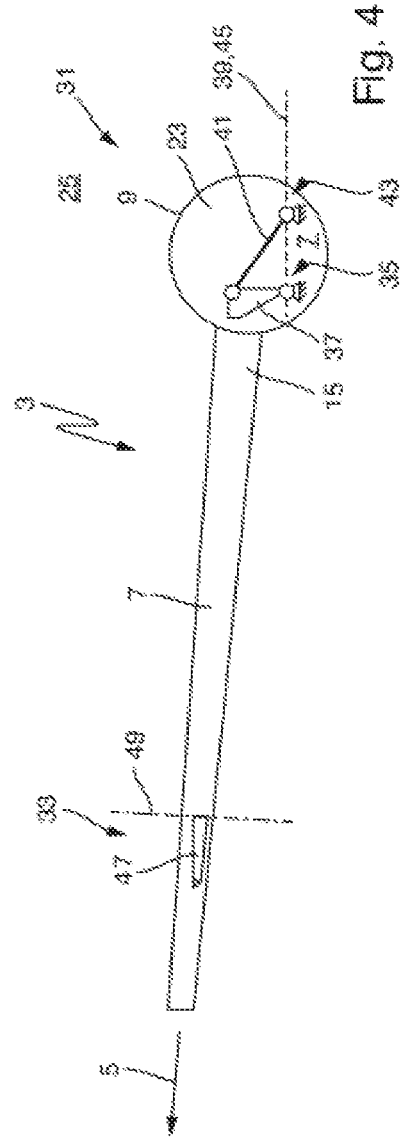
FIG. 4 schematically illustrates in a cross sectional view a section of a third embodiment of the wing shown in FIG. 1.

The wing tip section 7 comprises an inboard section 15, which is mounted to the fairing 9. The fairing 9 comprises a first fairing section 17, a second fairing section 19, a third fairing section 21, and defines an interior 23 (which is shown in FIG. 4) and an exterior 25 of the fairing 9. The first fairing section 17 is fluid-tight and arranged such that a first cavity is formed in the interior 23 of the fairing 9. The second fairing section 19 of the fairing 9 is also fluid-tight and arranged such that a second cavity is formed in the interior 23 of the fairing 9. The third fairing section 21 is mounted to the inboard section 15 of the wing tip section 7.

The movable device 11 is arranged in the exterior 25 of the fairing 9. The movable device 11 shown in FIG. 2 is a slat. However, the invention is not restricted to slats. The movable device 11 may alternatively be, for example, a droop nose or a Krueger flap. The movable device 11 is movable with respect to the wing tip section 7 between a retracted position and at least one extended position. Further, the fixed wing section 13 comprises an outboard section 27 which is connected to the wing tip section 7 and an inboard section which is configured to be mountable to a fuselage of the aircraft 1.

Figure 3:
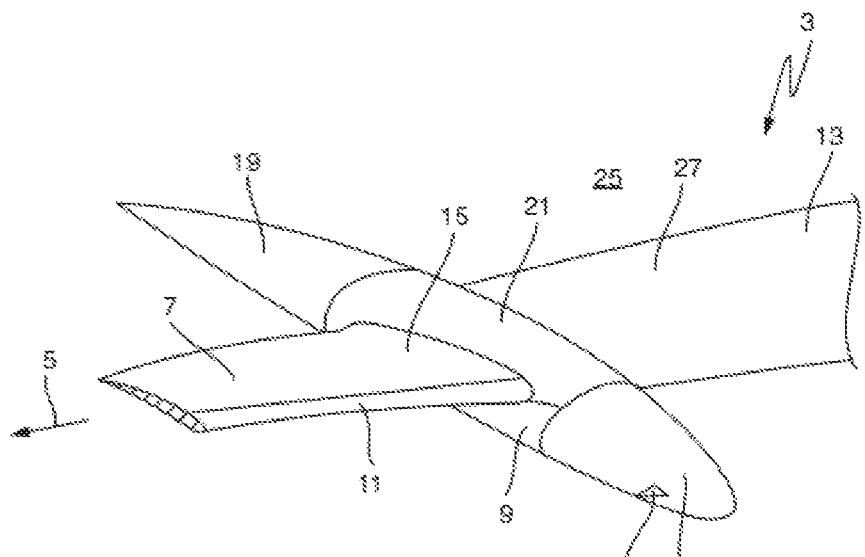
FIG. 3 schematically illustrates in a perspective view a section of a second embodiment of the wing shown in FIG. 1.

FIG. 3 schematically illustrates in a perspective view a section of a second embodiment of the wing 3 shown in FIG. 1. The second embodiment of the wing 3 essentially corresponds to the first embodiment of the wing 3 shown in FIG. 2, apart from the fact that the wing 3 comprises a fin 29 arranged on an outer surface of the fairing 9 and extending into the exterior 25 of the fairing 9.

FIG. 4 schematically illustrates in a cross sectional view a section of a third embodiment of the wing 3 shown in FIG. 1. The wing 3 comprises a connecting assembly comprising an inboard mechanism 31 and an outboard mechanism 33. The inboard mechanism 31 and the outboard mechanism 33 are arranged spaced apart from each other in the wingspan direction 5. The connecting assembly movably connects the movable device 11 (not shown in FIG. 4) to the wing tip section 7 such that the movable device 11 is movable between a retracted position and at least one extended position.

The inboard mechanism 31 comprises a first hinge 35 coupled to the wing tip section 7. The coupling of the first hinge 35 to the wing tip section 7 is indicated by reference sign 7 in the interior 23 of the fairing 9. Particularly, the inboard section 15 of the wing tip section 7 may extend into the interior 23 of the fairing 9 for being coupled to the first hinge 35. In addition, the inboard mechanism 31 comprises a first lever 37. The first lever 37 is coupled to the first hinge 35 such that the first lever 37 is pivotable about a first hinge axis 39. Further, the inboard mechanism 31 comprises a first strut 41 and a second hinge 43. The second hinge 43 is coupled to the first strut 41 and to the wing tip section 7 such that the first strut 41 is pivotable about a second hinge axis 45. The first hinge axis 39 and the second hinge axis 45 extend along the same line.

An opening which is not shown in the Figures is formed in the fairing 9. The opening connects the exterior 25 of the fairing 9 and the interior 23 of the fairing 9. Further, the inboard mechanism 31 of the connecting assembly comprises an actuating element 61, which extends through the opening. The actuating element 61 is movable between a first position and at least one second position. The opening is formed such that the actuating element 61 can extend through the opening in the first position, in the at least one second position, and when the actuating element 61 is moved between the first position and the at least one second position. The actuating element 61 comprises a first section 63 which is arranged in the interior 23 of the fairing 9. Further, the actuating element 61 comprises a second section 65 which is arranged in the exterior 25 of the fairing 9. The first section 63 of the actuating element 61 is mounted to the first lever 37 and is coupled to the first hinge 35 via the first lever 37 such that the actuating element 61 is pivotable about the first hinge axis 39. Further, the first section 63 of the actuating element 61 is coupled to the first strut 41 via the first lever 37. The second section 65 of the actuating element 61 is coupled to the movable device 11.

The outboard mechanism 33 comprises a second lever 47 which is pivotable about a third hinge axis 49 with respect to the wing tip section 7. The second lever 47 is coupled to the wing tip section 7 and to the movable device 11 to movably connect the movable device 11 to the wing tip section 7 such that the movable device 11 is movable between the retracted position and the at least one extended position.

Figure 5:
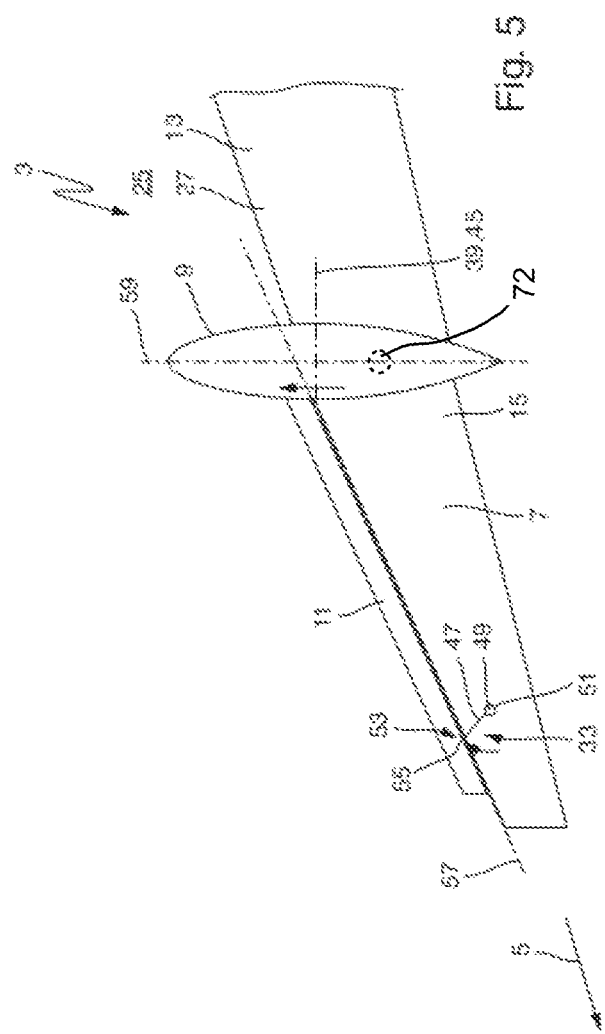
FIGS. 5 and 6 schematically illustrate in a top view a section of the third embodiment of the wing shown in FIG. 4.
Figure 6:
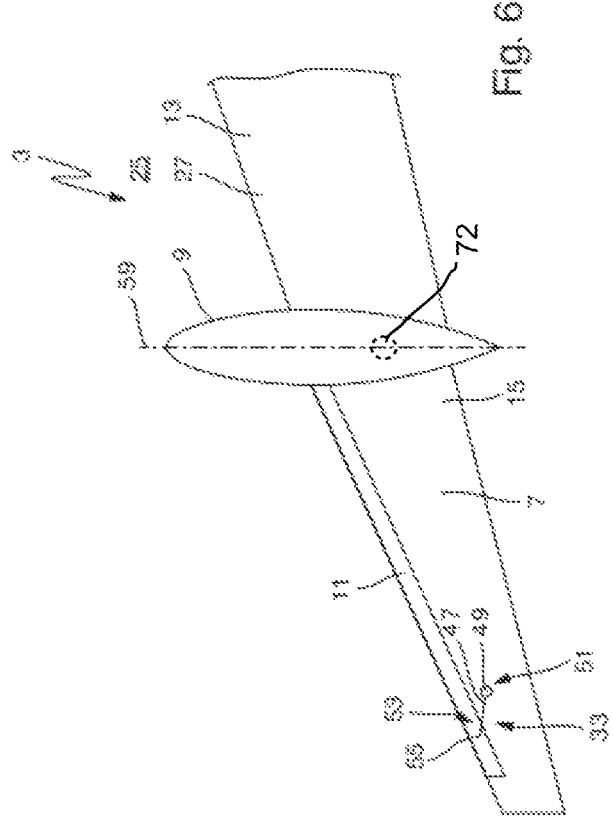

FIGS. 5 and 6 schematically illustrate in a top view a section of the third embodiment of the wing 3 shown in FIG. 4. FIG. 5 displays the movable device 11 in one of the at least one extended position and FIG. 6 displays the movable device 11 in the retracted position. The outboard mechanism 33 of the connecting assembly of the wing 3 comprises the second lever 47. Further, the outboard mechanism 33 comprises a third hinge 51 and a fourth hinge 53. The third hinge 51 is coupled to the second lever 47 and to the wing tip section 7. The fourth hinge 53 is coupled to the second lever 47 and to the movable device 11. The second lever 47 is pivotable about the third hinge axis 49 with respect to the wing tip section 7. Further, the second lever 47 is pivotable about a fourth hinge axis 55 with respect to the movable device 11. Further, a movement axis 57 is displayed in FIG. 5, around which the movable device 11 moves between the retracted position and the at least one extended position. Especially, the movable device 11 moves helically around the movement axis 57. As shown by the arrow oriented perpendicular to the first hinge axis 39, the inboard mechanism 31 imposes a motion on the movable device 11 in a flight direction perpendicular to the first hinge axis 39. Due to the sweep angle of the leading edge of the wing tip section 7 a relative motion along the leading edge is imposed on the movable device 11. The relative motion is used to drive the movement of at least a section of the outboard mechanism 33 (as shown by the curved arrow pointing to the fourth hinge axis 55), particularly to drive the movement of the second lever 47 about the third hinge axis 49. The movement of the movable device 11 can be regarded as a combination of a translation and a rotation with respect to the wing tip section 7.

Further, the fixed wing section 13 is mounted to the wing tip section 7 via a sixth hinge 72 arranged in the interior 23 of the fairing 9 and such that the wing tip section 7 is pivotable about a sixth hinge axis 59 between an extended position shown in FIGS. 5 and 6 and a folded position.

Figure 7:
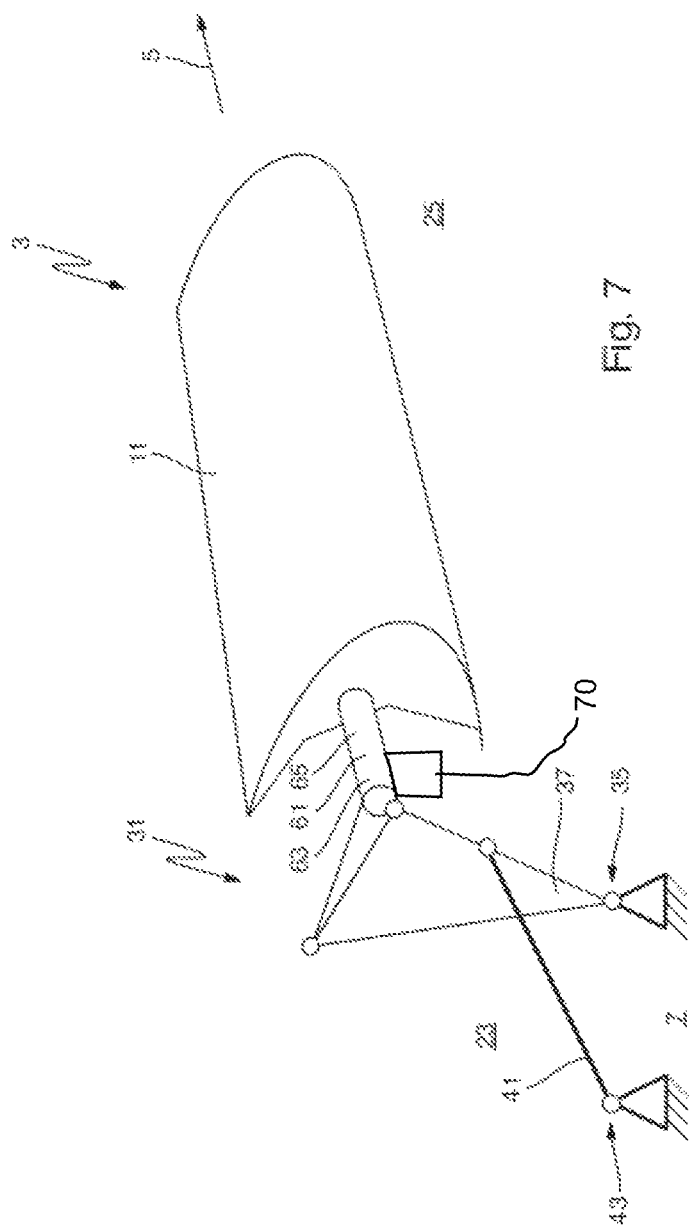
FIG. 7 schematically illustrates a first embodiment of an inboard mechanism of the wing shown in FIG. 4.

FIG. 7 schematically illustrates a section of a first embodiment of the inboard mechanism 31 of the wing 3 shown in FIG. 4. The actuating element 61 comprises the first section 63 and the second section 65. The first section 63 of the actuating element 61 is coupled to the first lever 37 and the second section 65 of the actuating element 61 is coupled to the movable device 11.

FIG. 8 schematically illustrates a second embodiment of the inboard mechanism 31 of the wing 3 shown in FIG. 4. The inboard mechanism 31 comprises a first track 67 with a first track surface 68. The first track 67 is mounted to the wing tip section 7. Further, the inboard mechanism 31 comprises four first rollers 69 which roll along the first track surface when the movable device 11 moves between the retracted position and the at least one extended position. Two first rollers 69 of the four first rollers 69 are mounted to the first section 63 of the actuating element 61. The other two first rollers 69 of the four first rollers 69 are mounted to a seventh hinge 71 which is mounted to the first section 63 of the actuating element 61. Due to the seventh hinge 71, the actuating element 61 is pivotable about a seventh hinge axis 73 with respect to the other two first rollers 69 of the four first rollers 69.

FIG. 9 schematically illustrates a section of a first embodiment of the outboard mechanism 33 of the wing 3 shown in FIG. 4. The outboard mechanism 33 comprises the second lever 47, the third hinge 51 coupled to the second lever 47 and to the wing tip section 7, and the fourth hinge 53 coupled to the second lever 47 and to the movable device 11 such that the second lever 47 is pivotable about a third hinge axis 49 and about a fourth hinge axis 55. Further, the outboard mechanism 33 comprises an eighth hinge 75 and a ninth hinge 77. The eighth hinge 75 is coupled to the second lever 47 and to the wing tip section 7, and the ninth hinge 77 is coupled to the second lever 47 and to the movable device 11 such that the second lever 47 is pivotable about the third hinge axis 49 and about the fourth hinge axis 55.

FIG. 10 schematically illustrates a section of a second embodiment of the outboard mechanism 33 of the wing 3 shown in FIG. 4. The outboard mechanism 33 comprises a second strut 79 coupled to the wing tip section 7 and to the movable device 11.

FIG. 11 schematically illustrates a section of a third embodiment of the outboard mechanism 33 of the wing 3 shown in FIG. 4. The outboard mechanism 33 comprises the second strut 79 and a fifth hinge 81 coupled to the wing tip section 7 and coupled to the second strut 79 such that the second strut 79 is pivotable about a fifth hinge axis 83.

FIG. 12 schematically illustrates a section of a fourth embodiment of the outboard mechanism 33 of the wing 3 shown in FIG. 4. The outboard mechanism 33 comprises a second track 85 with a second track surface 87. Further, the outboard mechanism 33 comprises four second rollers 89 which are rotatably mounted to the wing tip section 7 and roll along the second track surface 87 when the movable device 11 moves between the retracted position and the at least one extended position.

Further, the wing 3 comprises a seal with a first section connected to the fairing 9 and a second section abutting the actuating element 61 when the movable device 11 is moved between the retracted position and the at least one extended position such that the interior 23 of the fairing 9 and the exterior 25 of the fairing 9 are separated from each other by the seal.

Additionally, the wing 3 comprises a drive mechanism 70 which is drivingly coupled to the first section 63 of the actuating element 61 and thereby drives movement of the actuating element 61. The drive mechanism 70 is arranged in the interior 23 of the fairing 9.

It is additionally pointed out that features that have been described with reference to one of the above exemplary embodiments may also be disclosed as in combination with other features of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
a wing tip section with an inboard section,
a fairing in which an opening connecting an exterior of the fairing and an interior of the fairing is formed and which is mounted to the inboard section of the wing tip section,
a movable device arranged on the exterior of the fairing,
a connecting assembly movably connecting the movable device to the wing tip section such that the movable device is movable between a retracted position and at least one extended position, and
a drive mechanism,
wherein the connecting assembly comprises an actuating element, which extends through the opening and comprises a first section, which is arranged in the interior of the fairing and is drivingly coupled to the drive mechanism, and a second section, which is arranged on the exterior of the fairing and coupled to the movable device, and
wherein the connecting assembly comprises an inboard mechanism comprising the actuating element and an outboard mechanism, which is arranged spaced apart in a wingspan direction of the wing from the inboard mechanism.

2. The wing according to claim 1, wherein a first fairing section of the fairing is fluid-tight and arranged such that a first cavity is formed in the interior of the fairing.

3. The wing according to claim 1, wherein a second fairing section of the fairing is fluid-tight and arranged such that a second cavity is formed in the interior of the fairing.

4. The wing according to claim 1, wherein the movable device is a leading edge movable device.

5. The wing according to claim 4, wherein the leading edge movable device is a slat.

6. The wing according to claim 1, wherein the movable device is a trailing edge movable device.

7. The wing according to claim 1, wherein the inboard mechanism comprises a first hinge coupled to the actuating element and coupled to the wing tip section such that the actuating element is pivotable about a first hinge axis.

8. The wing according to claim 7, wherein the inboard mechanism comprises a first lever coupled to the actuating element and coupled to the first hinge such that the first lever is pivotable about the first hinge axis.

9. The wing according to claim 7,
wherein the inboard mechanism comprises a first strut coupled to the actuating element and a second hinge coupled to the first strut and to the wing tip section such that the first strut is pivotable about a second hinge axis, and
wherein the first hinge axis and the second hinge axis extend along the same line.

10. A wing according to claim 1, wherein the inboard mechanism comprises a first strut coupled to the actuating element and a second hinge coupled to the first strut and to the wing tip section such that the first strut is pivotable about a second hinge axis.

11. The wing according to claim 1, wherein the inboard mechanism comprises a first track with a first track surface and a first roller which rolls along the first track surface when the movable device moves between the retracted position and the at least one extended position.

12. The wing according to claim 1, wherein the outboard mechanism comprises a second lever, a third hinge coupled to the second lever and to the wing tip section, and a fourth hinge coupled to the second lever and to the movable device such that the second lever is pivotable about a third hinge axis and about a fourth hinge axis.

13. The wing according to claim 1, wherein the outboard mechanism comprises a second strut coupled to the wing tip section and to the movable device.

14. The wing according to claim 13, wherein the outboard mechanism comprises a fifth hinge coupled to the wing tip section and coupled to the second strut such that the second strut is pivotable about a fifth hinge axis.

15. The wing according to claim 1, wherein the outboard mechanism comprises a second track with a second track surface and a second roller which rolls along the second track surface when the movable device moves between the retracted position and the at least one extended position.

16. The wing according to claim 1, wherein the wing comprises a fixed wing section mounted to the wing tip section via a sixth hinge arranged in the interior of the fairing such that the wing tip section is pivotable about a sixth hinge axis between an extended position and a folded position.

17. The wing according to claim 1, wherein the wing comprises a fin arranged on an outer surface of the fairing and extending into the exterior of the fairing.

18. An aircraft comprising a wing according to claim 1.

* * * * *